(12) United States Patent
Collette et al.

(10) Patent No.: US 12,310,360 B2
(45) Date of Patent: *May 27, 2025

(54) INSECT REPELLANT-INFUSED DISPOSABLE ARTICLES

(71) Applicant: ASPEN HEALTHCARE SOLUTIONS LLC, Idaho Falls, ID (US)

(72) Inventors: Robert Collette, Idaho Falls, ID (US); Jeffrey Willson, Idaho Falls, ID (US); Derek Collette, Idaho Falls, ID (US); Jared Collette, Idaho Falls, ID (US); Travis Collette, Idaho Falls, ID (US); Trevor Collette, Idaho Falls, ID (US)

(73) Assignee: ASPEN HEALTHCARE SOLUTIONS LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,676

(22) Filed: Jul. 21, 2023

(65) Prior Publication Data

US 2023/0354806 A1    Nov. 9, 2023

Related U.S. Application Data

(63) Continuation of application No. 17/124,466, filed on Dec. 16, 2020.

(51) Int. Cl.
| | |
|---|---|
| *A41D 31/12* | (2019.01) |
| *A01N 25/34* | (2006.01) |
| *A01N 27/00* | (2006.01) |
| *A01N 37/18* | (2006.01) |
| *A01N 43/40* | (2006.01) |
| *A01N 65/00* | (2009.01) |
| *A01N 65/06* | (2009.01) |
| *A01N 65/22* | (2009.01) |
| *A01N 65/28* | (2009.01) |
| *A01N 65/34* | (2009.01) |
| *A01N 65/36* | (2009.01) |
| *A01N 65/44* | (2009.01) |
| *A41D 31/10* | (2019.01) |

(52) U.S. Cl.
CPC ............. *A01N 25/34* (2013.01); *A01N 27/00* (2013.01); *A01N 37/18* (2013.01); *A01N 43/40* (2013.01); *A01N 65/00* (2013.01); *A01N 65/06* (2013.01); *A01N 65/22* (2013.01); *A01N 65/28* (2013.01); *A01N 65/34* (2013.01); *A01N 65/36* (2013.01); *A01N 65/44* (2013.01); *A41D 31/10* (2019.02); *A41D 31/12* (2019.02)

(58) Field of Classification Search
None
See application file for complete search history.

(56) References Cited

FOREIGN PATENT DOCUMENTS

| | | | | |
|---|---|---|---|---|
| CN | 105177858 A | * | 12/2015 | |
| CN | 105233329 A | * | 1/2016 | |
| CN | 111634021 A | * | 9/2020 | ............. A41D 31/14 |
| DE | 3826425 A | * | 2/1989 | ....... A61F 13/15203 |
| JP | 2001302409 A | * | 10/2001 | |
| JP | 2017105724 A | * | 6/2017 | |

* cited by examiner

*Primary Examiner* — Alton N Pryor
(74) *Attorney, Agent, or Firm* — Winder Intellectual Property Law LLC; Brent T. Winder

(57) ABSTRACT

A disposable article infused with an insect repellant and method of making the same. The disposable article includes an outer, water absorbent layer, an inner, waterproof layer and an insect repellant applied to the outer layer. The disposable article can be fabric gowns, shoe-covers, leg coverings, hand coverings, arm coverings, head coverings, body coverings, face coverings, full body coverings and chuck pads. In certain embodiments, the outer, water absorbent layer is spun-bonded polypropylene. In other embodiments, the outer, water absorbent layer is spun-bonded polyester. The inner, waterproof layer can be cast polyethylene. The insect repellant can include an effective amount of DEET (N,N-diethyl-meta-toluamide), OLE (oil of lemon *eucalyptus*) and essential oils alone or in combination.

28 Claims, 7 Drawing Sheets

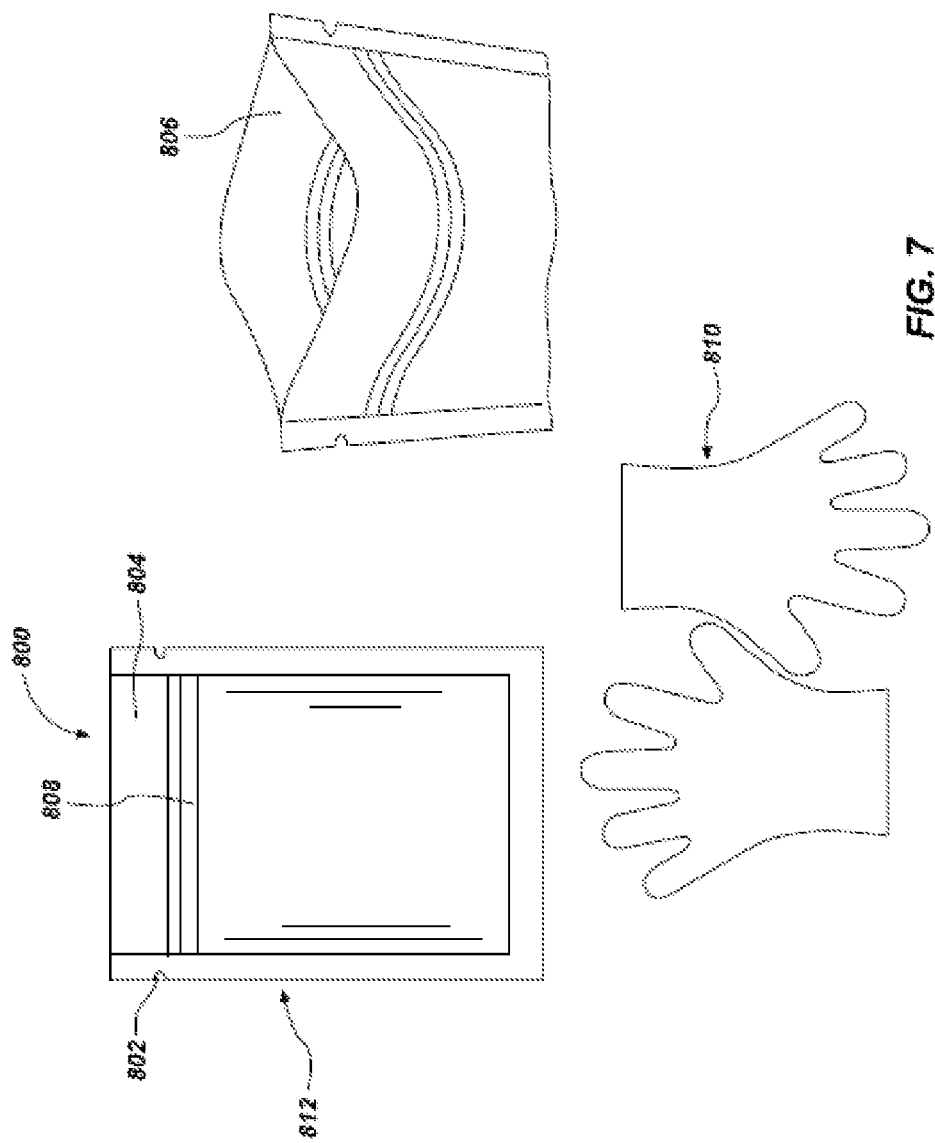

INSECT REPELLANT-INFUSED DISPOSABLE ARTICLES

RELATED APPLICATIONS AND PRIORITY CLAIM

This application is a continuation of U.S. application Ser. No. 17/124,466, titled Insect Repellant-Infused Disposable Articles filed Dec. 16, 2020, which is hereby incorporated by reference for its supporting teachings.

BACKGROUND

Service providers are often required to enter homes and other spaces infested with bedbugs and bedbug eggs. This is especially problematic in home healthcare services as healthcare providers are often obliged to come in close contact with bedding, furniture and other contaminated materials and surfaces. Without proper protection, caregivers and other service providers may be reluctant to enter such environments out of fear of spreading bedbugs from a patient's environment to their own homes, vehicles, workplaces, or other areas. This reluctance can potentially result in reduced availability of such services or compromised quality of the services.

A number of insect repellants have been identified as an effective deterrent to the spreading of bedbug. Notably, DEET (N,N-diethyl-meta-toluamide) has shown exceptional effectiveness in deterring the transmission of bedbugs. It does not kill the bugs as it is generally of low acute toxicity. However, this low toxicity is desirable as based on available toxicological data, normal usage does not present a health concern to the general U.S. population.

Oil of lemon *eucalyptus* (OLE) and essential oils such as arborvitae, cedar wood, citronella, lemongrass, lemon, peppermint, apple cider vinegar, *eucalyptus*, bergamot, lavender, wintergreen, *melaleuca* and rosemary alone or in combination have also been demonstrated to possess insect repellant properties—with particularly advantageous application in deterring bedbug transmission. OLE and essential oils are also attractive as natural repellant solutions.

However, all of these repellants are known to have a corrosive effect on plastics. As such, they are not generally viable to apply to plastic outwear that could be used by home healthcare providers. However, it has been discovered that, when used in combination with certain weaves and combinations of plastic-based materials, DEET, OLE and essential oil-based repellants can be applied without any visible degradation to the materials. Thus, the present invention in its various embodiments allows for maximum bedbug repellence without significant degradation of the articles to which the repellants are applied.

A second issue that must be confronted in addressing this problem is cost. Specifically, known bedbug repellant solutions are not viable solutions in environments where clothing must be either discarded after use or run through a lengthy decontamination process. The present invention in its various embodiments allows healthcare workers to use new and fully packaged treated articles for each home visit thus eliminating the risk of cross-contamination while at the same time being an affordable solution.

All of the foregoing problems as well as others are addressed by the present invention in its various embodiments. It is also noted that, while the present invention is discussed with particular application in protection from bedbugs, it is not limited to only bedbug infested environments. The present invention could also be similarly utilized in spaces with other transmittable infestations including, but not limited to, flies, mosquitos, fleas, cockroaches, mites and ticks.

SUMMARY

The present invention is a disposable article infused with an insect repellant. The disposable article includes an outer, water absorbent layer, an inner, waterproof layer and an insect repellant applied to the outer layer. The disposable article can be fabric gowns, shoe-covers, leg coverings, hand coverings, arm coverings, head coverings, body coverings, face coverings, full body coverings and chuck pads. In certain embodiments, the outer, water absorbent layer is spun-bonded polypropylene. In other embodiments, the outer, water absorbent layer is spun-bonded polyester. The inner, waterproof layer can be cast polyethylene. The insect repellant can include an effective amount, alone or in combination, of DEET (N,N-diethyl-meta-toluamide), OLE (oil of lemon *eucalyptus*) or essential oils. Essential oils include arborvitae, cedar wood, citronella, lemongrass, lemon, peppermint, apple cider vinegar, *eucalyptus*, tea tree, bergamot, lavender, wintergreen, *melaleuca* and rosemary, again, alone or in combination. In certain embodiments, the DEET is in concentrations of at least 30% by volume. In certain embodiments, the OLE is in concentrations of at least 30% by volume. In certain embodiments, the essential oils are in concentrations of 0.18% by volume.

The insect repellant can also include picaridin in concentrations of 7% by volume or greater as well as permethrin in concentrations of 0.5% by volume or greater; isolongifolenone in concentrations of 5% by volume or greater; isolongifolanone concentrations of 5% by volume or greater; ethyl butylacetylaminopropionate, sold under the trademark IR3535® in concentrations of 20% by volume or greater; and 2-undecanone in concentrations of 7.75% by volume or greater, all of the foregoing alone or in combination.

A method of infusing a disposable article with an insect repellant is also disclosed. A disposable article having an outer, water absorbent layer and an inner, waterproof layer is provided. An insect repellant is applied to the outer, water absorbent layer and then dried. In one embodiment, the outer, water absorbent layer is spun-bonded polypropylene. In one embodiment, the outer, water absorbent layer is spun-bonded polyester. In one embodiment, the inner, waterproof layer is cast polyethylene. In one embodiment, the insect repellant includes an effective amount, alone or in combination, of DEET (N,N-diethyl-meta-toluamide), OLE (oil of lemon *eucalyptus*) or essential oils.

In certain embodiments, DEET concentrations are at least 30% by volume. In certain embodiments, OLE concentrations are at least 30% by volume. In yet other embodiments, essential oils concentrations are at least 0.18% by volume. Suitable essential oils include arborvitae, cedar wood, citronella, lemongrass, lemon, peppermint, apple cider vinegar, *eucalyptus*, tea tree, bergamot, lavender, wintergreen, *melaleuca* and rosemary.

BRIEF DESCRIPTION OF DRAWINGS

FIG. 7 is an example of packaging for a bedbug repellant article of disposable clothing according to one embodiment of the present invention.

DESCRIPTION OF ILLUSTRATED EMBODIMENTS

Figure 1:
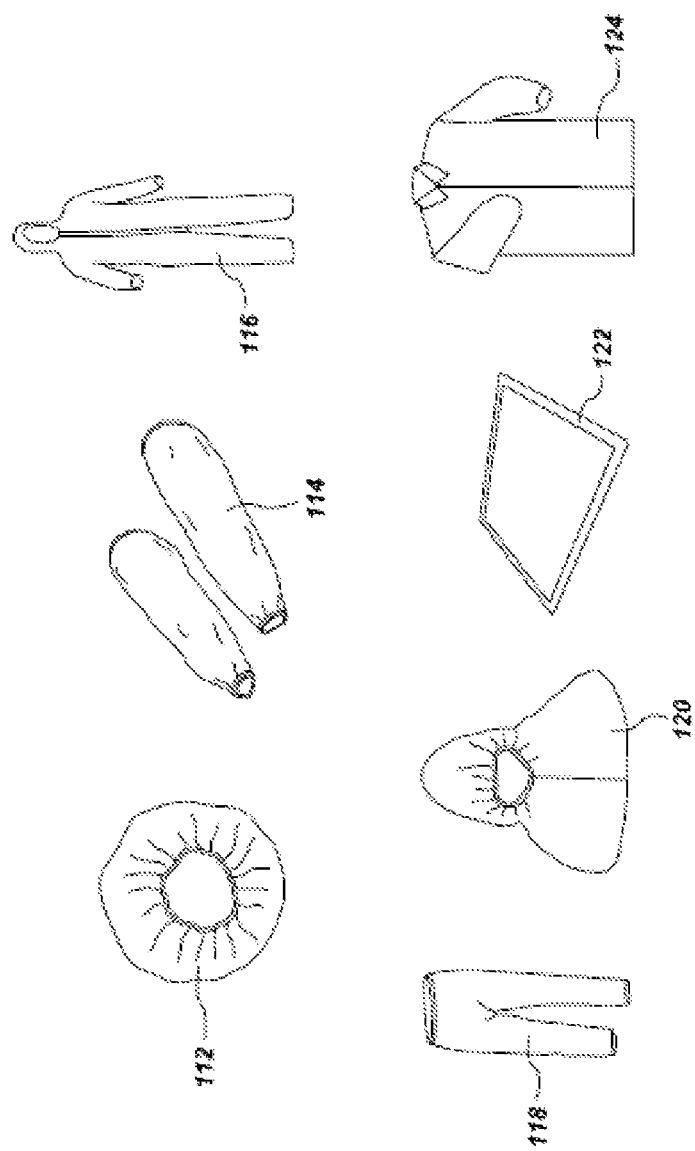
FIG. 1 is an example of articles suitable for treatment under the present methodology.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present invention in its various embodiments comprises a disposable article infused with a bedbug repellant or, more generally, an insect repellant. The disposable articles can include non-sterile disposable fabric gowns, shoe-covers, leg coverings, hand coverings, arm coverings, head coverings, body coverings, face coverings, full body coverings and chuck pads.

It has been discovered that articles having an outer, water absorbent layer of spun-bonded polypropylene (PP) or spun-bonded polyester (PET) and an inner, waterproof layer of cast polyethylene (CPE) are particularly well-suited for use in connection with the present invention. These articles are available from McKesson Corporation (Irving, Texas) and Medline Industries, Inc. (Northfield, Illinois). Despite both materials largely comprising plastics, it has been found that they do not experience any significant degradation or dissolution when DEET, OLE and essential oil-based repellants alone or in combination with other repellants are applied. CPE and PP also happen to be among the most common disposable fabric used in the healthcare industry making the present discovery particularly valuable.

As noted above, DEET, OLE and essential oil-based repellants are known to dissolve or corrode plastics. However, when applying the methodologies of the present invention, articles largely comprising plastic materials, surprisingly show no observable adverse effects when treated with such repellants. It is believed that the combination of weaves in the outer layers of the articles allow them to absorb repellants but also help prevent direct contact of the repellant with the underlying plastics in the inner layers which would result in their degradation. Thus, the present combination of materials and repellants allows for maximum bedbug repellence without significant degradation of the articles.

In certain embodiments, the outer layer can also include polyester meshes and traditional porous fabrics such as wool, cotton, ramie, flax, bamboo, hemp and flannel alone or in combination. The two-layered materials used in the treated articles can be created by a variety of known techniques including, but not limited to, laminating or coating.

As discussed above, DEET, OLE and essential oil-based repellants are highly effective repellants for bedbugs. DEET is generally believed to be optimal in this capacity at concentrations of at least 30% by volume. However, the present invention is not limited to the specific concentration. Rather, any concentration of DEET, alone or in combination with other repellants, that acts as a deterrent to bedbug transmission, is considered to be within the scope of the present invention.

Similarly, oil of lemon *eucalyptus* (OLE) is optimal in this capacity at concentrations of at least 30% by volume. However, the present invention is not limited to the specific concentration. Rather, any concentration of OLE, alone or in combination with other repellants, that acts as a deterrent to bedbug transmission, is considered to be within the scope of the present invention.

Likewise, essential oils are optimal in this capacity at concentrations of 0.18%. However, the present invention is not limited to the specific concentration. Rather, any concentration of essential oils, alone or in combination with other repellants, that acts as a deterrent to bedbug transmission, is considered to be within the scope of the present invention.

Other known repellants can also be incorporated into the present invention in combination with DEET, OLE or essential oils. These include, but are not limited to, the following alone or in combination:

1) Picaridin concentrations of 7% by volume or greater;
2) Permethrin concentrations of 0.5% by volume or greater;
3) Isolongifolenone concentrations of 5% by volume or greater;
4) Isolongifolanone concentrations of 5% by volume or greater;
5) Ethyl butylacetylaminopropionate, sold under the trademark IR3535® available from Merck KGaA (Darmstadt, Germany) concentrations of 20% by volume or greater; and
6) 2-undecanone concentrations of 7.75% by volume or greater.

In certain embodiments, the repellant may also include up to 65% p-menthane-3,8-diol by volume, again, alone or in combination with other repellants.

The insect repellant can be applied to the articles of disposable clothing in a variety of ways including, but not limited to direct topical application such as atomizing, spraying, brushing, coating dipping, drenching, dripping, infusing, pouring, rolling on, spreading or wiping. Depending on the desired level of coverage, each of these methods could be used alone or in combination.

As depicted in FIG. 1, the methodology described herein can be applied to a variety of articles including, but not limited to a head cap 112, arm sleeves 114, a full body suit 116, pants 118, hoods 120, under pads 122 and shirts 124.

Figure 2:
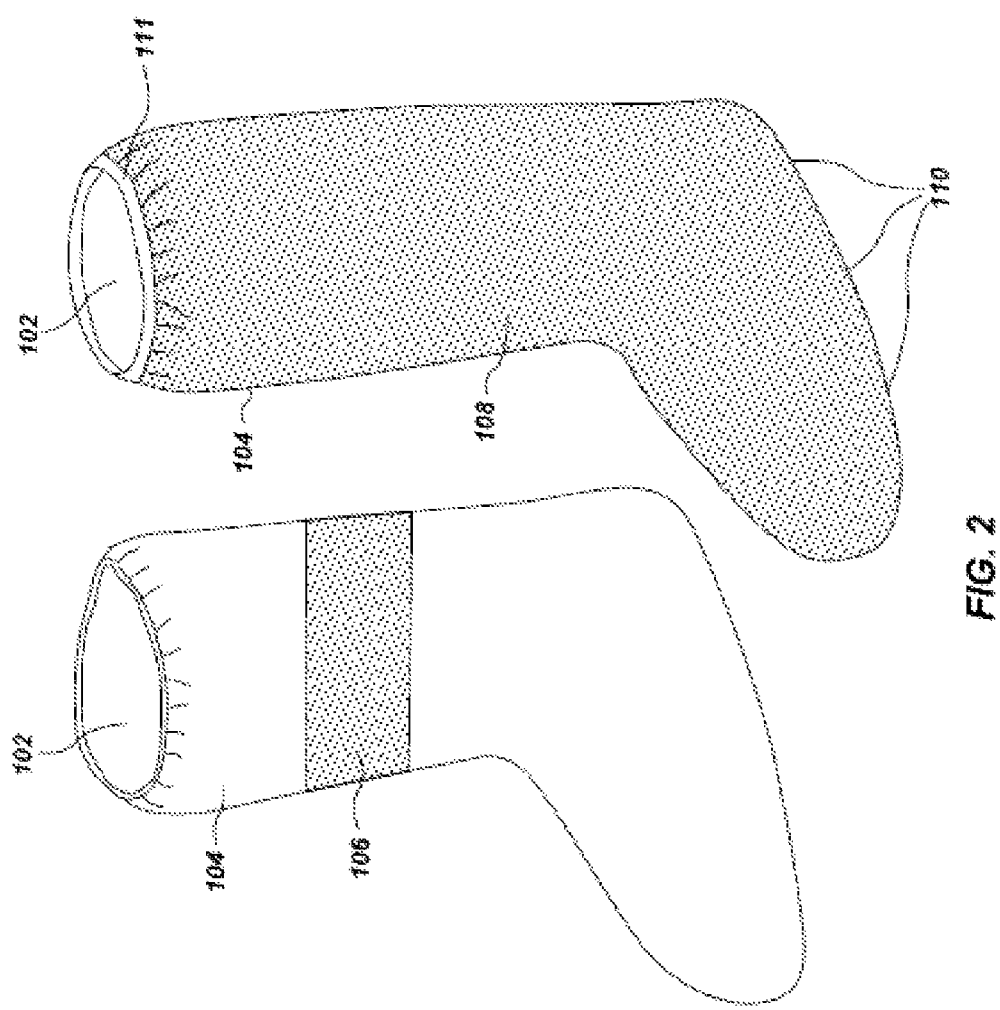
FIG. 2 depicts bedbug repellant disposable shoe coverings according to one embodiment of the present invention.

FIG. 2 is an illustration of treated two-layer knee-length shoe coverings 100, 200. In both embodiments, a hybrid substrate is provided having an inner layer 102 of cast polyethylene (CPE) and an outer layer 104 of spun-bonded propylene (PP). The outer layer 104 is, in this embodiment, infused with a repellant comprising approximately 30% by volume distilled water, 5% by volume isolongifolanone, 5% by volume isolongifolenone and approximately 30% oil of lemon *eucalyptus* and 30% DEET. The repellant is applied by either a spray and dry method or a dip and dry method. In the embodiment depicted at 100, the repellant is applied as a band 106. In the embodiment depicted at 200, the repellant 108 is fully applied to the outer surfaces of the article excluding the sole—which in this illustration includes one or more latex grip patterns 110. An elastic band 111 can also be included to minimize the potential of breaches.

Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

Figure 3:
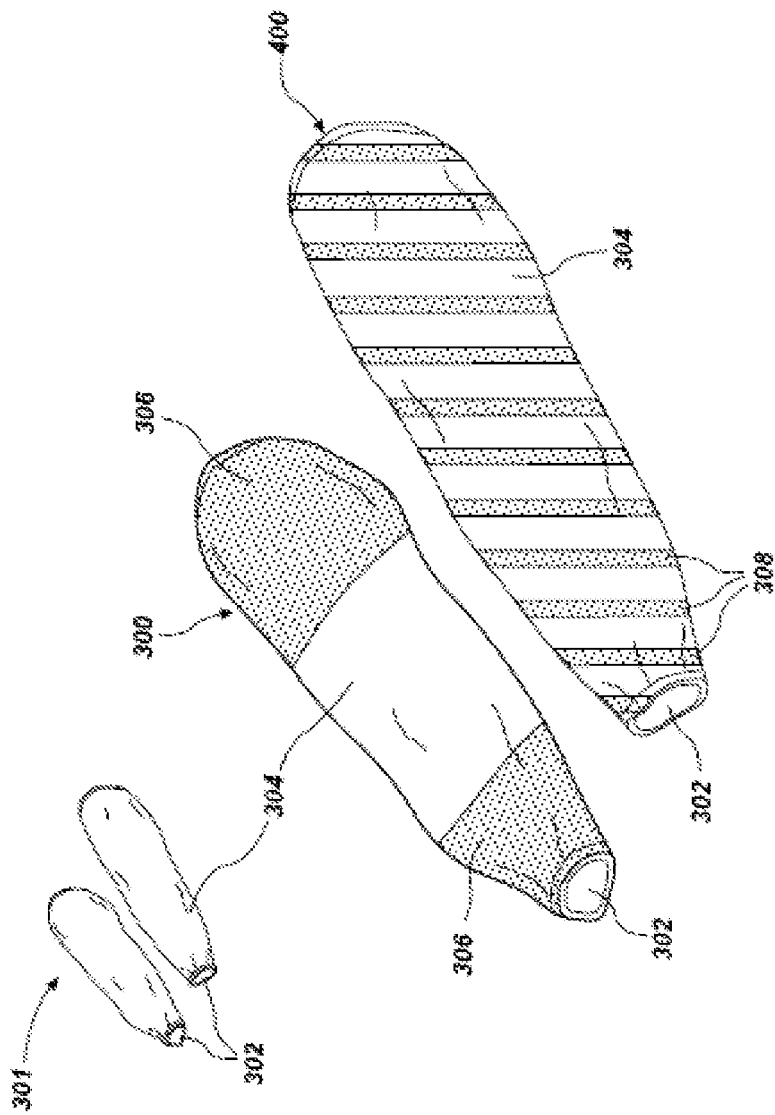
FIG. 3 depicts bedbug repellant disposable arm coverings according to one embodiment of the present invention.

FIG. 3 illustrates treated two-layer arm coverings 300, 400. Untreated coverings depicted generally at 301 are also shown for illustration purposes. In both embodiments, a hybrid substrate is provided having an inner layer 302 of cast polyethylene (CPE) and an outer layer 304 of spun-bonded propylene (PP). The outer layer 304 is, in this embodiment, infused with a repellant comprising approximately 30% Distilled Water, 5% by volume isolongifolanone, 5% by volume isolongifolenone and approximately 30% oil of lemon *eucalyptus* and 30% DEET. The repellant is applied by either a spray and dry method or a dip and dry method. In the embodiment depicted at 300, the repellant is applied as two horizontally oriented bands 306. In the embodiment depicted at 400, the repellant is applied as a plurality of diagonally oriented bands 308. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

Figure 4:
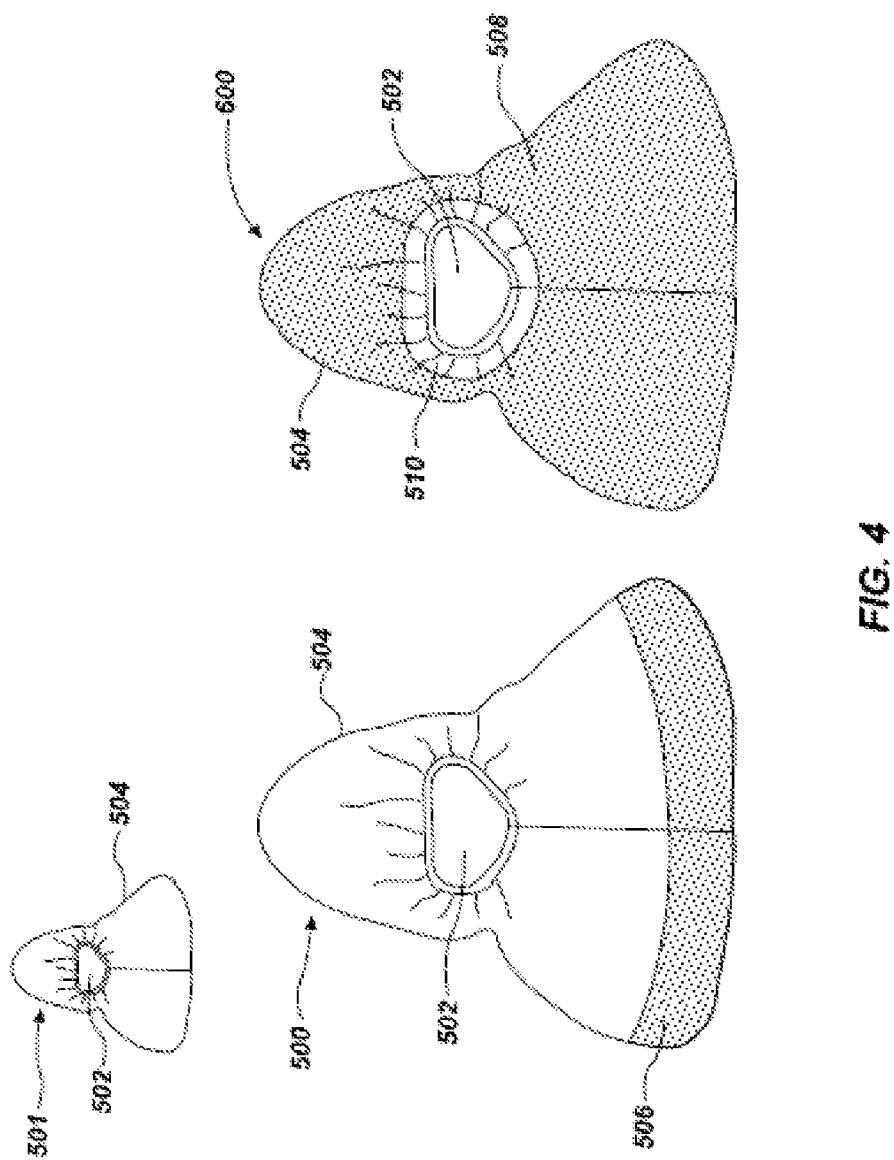
FIG. 4 depicts bedbug repellant disposable head coverings according to one embodiment of the present invention.

FIG. 4 illustrates treated two-layer head coverings 500, 600. An untreated covering depicted generally at 501 is also shown for illustration purposes. In both embodiments, a hybrid substrate is provided having an inner layer 502 of cast polyethylene (CPE) and an outer layer 504 of spun-bonded propylene (PP). The outer layer 504 is, in these embodiments, infused with a repellant comprising approximately 30% Distilled Water, 5% by volume isolongifolanone, 5% by volume isolongifolenone and approximately 30% oil of lemon *eucalyptus* and 30% DEET. The repellant is applied by either a spray and dry method or a dip and dry method. In the embodiment depicted at 500, the repellant is applied as a horizontally oriented band 506. In the embodiment depicted at 600, the repellant 508 is fully applied to the outer surfaces of the article excluding an elastic band 510 at the face opening. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

Figure 5:
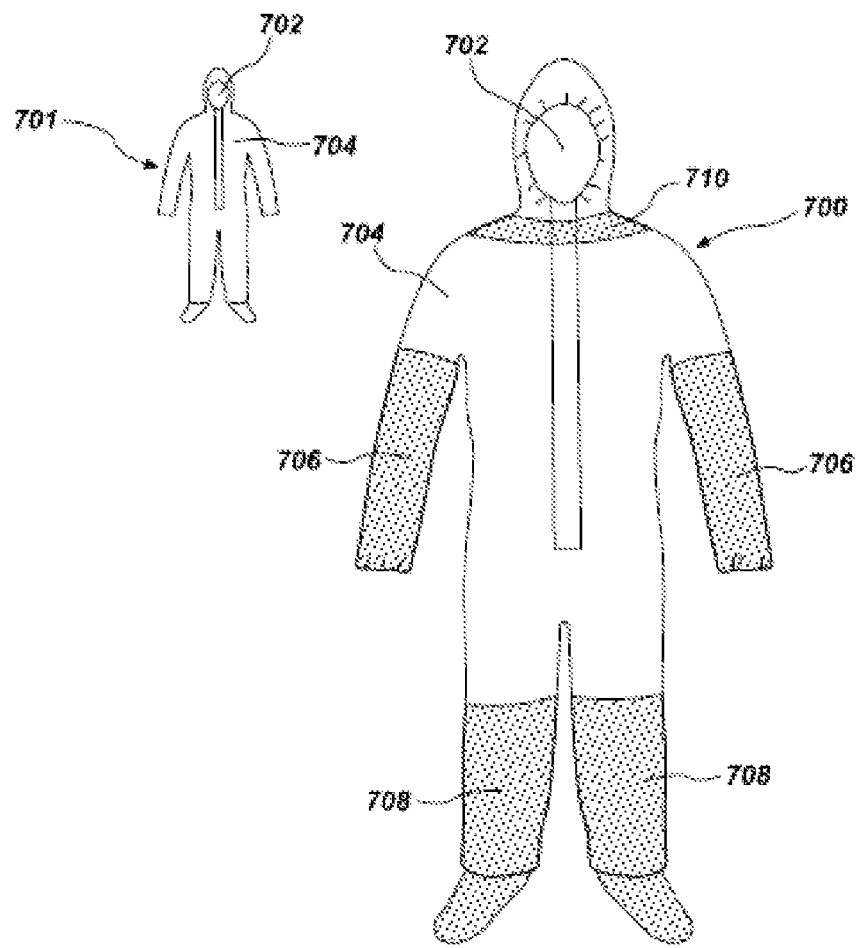
FIG. 5 depicts a bedbug repellant disposable body coverings according to one embodiment of the present invention.

FIG. 5 illustrates treated two-layer full body covering 700. An untreated covering depicted generally at 701 is also shown for illustration purposes. A hybrid substrate is provided having an inner layer 702 of cast polyethylene (CPE) and an outer layer 704 of spun-bonded propylene (PP). The outer layer 704 is, in this embodiment, infused with a repellant comprising approximately 30% Distilled Water, 5% by volume isolongifolanone, 5% by volume isolongifolenone and approximately 30% oil of lemon *eucalyptus* and 30% DEET. The repellant is applied by either a spray and dry method or a dip and dry method. In the illustrated embodiment, the repellant is discretely applied to the arms 706, legs and feet 708 and a collar section 710. It is however noted that the repellant could also be applied to the entire outer surface of the article or substantially the entire outer surface. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

Figure 6:
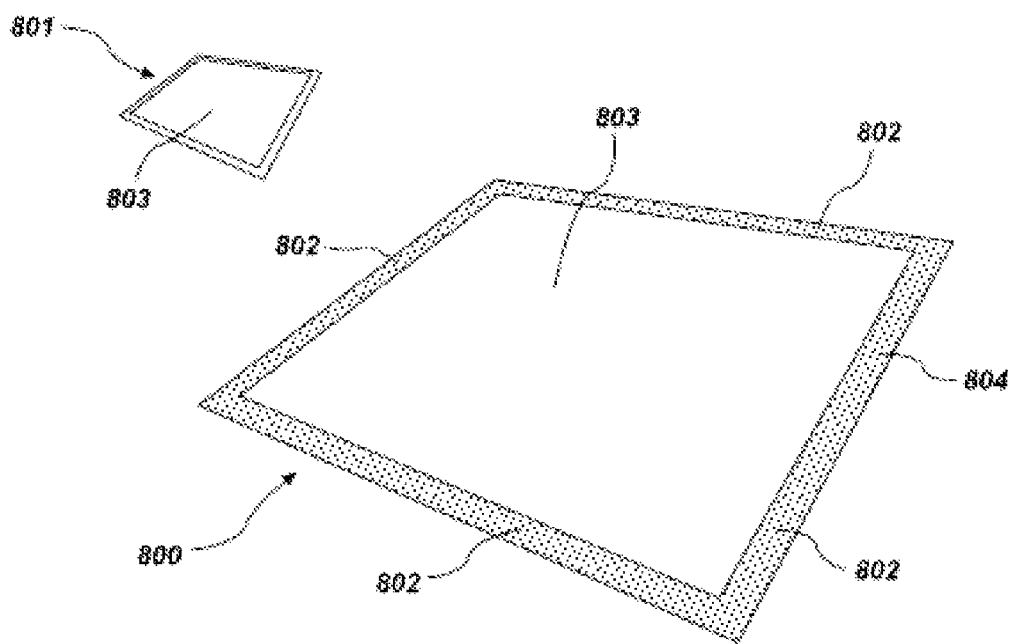
FIG. 6 depicts a bedbug repellant disposable underpaid according to one embodiment of the present invention.

FIG. 6 depicts a bedbug repellant disposable underpad 800 according to one embodiment of the present invention. Similar to the clothing articles discussed above, a hybrid substrate is provided having a bottom layer of cast polyethylene (CPE)(not visible) and an upper layer 804 of spun-bonded propylene (PP). The upper layer 804 is infused with a repellant comprising approximately 30% Distilled Water, 5% by volume isolongifolanone, 5% by volume isolongifolenone and approximately 30% oil of lemon *eucalyptus* and 30% DEET. The repellant is applied by either a spray and dry method or a dip and dry method. In the illustrated embodiment, the repellant is applied around the edges 802 of the underpaid 800 leaving the absorptive pad 803 untreated. It is noted that in certain embodiments the repellant could be applied only a portion of the edges 802. For example, in one embodiment, only three edges are treated in whole or in part. In other embodiments, two edges are treated in whole or in part. In yet other embodiments, only one edge is treated in whole or in part. In the illustrated embodiment, the repellant treatment extends substantially to the absorptive pad 803. However, in other embodiments, the repellant treatment may only extend partway to the absorptive pad. An untreated underpaid 801 is also shown for illustration purposes. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

As noted above, in certain embodiments, the insect repellant may only need to be applied to a portion of the treated article. For example, a single band of repellant applied to one's clothing can be sufficient to repel bed bugs. This limited application is valuable in that it allows for considerably less repellant to be used thereby minimizing costs as well as potential repellant side effects on the wearer and those nearby. However, the precise location and size of the treated areas could be adapted depending on need and circumstances and all patterns and coverages are considered to be within the scope of the present invention.

As discussed above, one advantage to the present invention is that it allows a single, protective and bedbug repellant article to be worn once, at a single location, and then discarded. Upon arriving at a second location, a new treated article can be opened and used. Bearing that advantage in mind, disposable packaging is also advantageous for use with the present invention. FIG. 7 depicts suitable product packaging according to one embodiment. It is noted that proper and immediate packaging after treatment is important as it allows maximum capture of the repellant after application and maximum longevity of the articles after opening.

In this embodiment, the packaging is a pouch 800 that can be torn open at perforation 802. The pouch 800 is two-layered with the outer layer being 804 polymer plastic and the inner layer 806 being aluminum foil. In this embodiment, the pouch 800 should be effectively impermeable to gas and liquid with permeability of 25 um or less. Pouch 800 can also include a zip closure mechanism 808 allowing it to be resealed for safe disposal of treated article once used. Disposable PE gloves 810 can be included to reduce direct contact with the treated article by the user. Pouch 800 can also include a source designation and product description 812.

In one embodiment, where the disposable clothing article is sprayed with repellant, the application would be for approximately 3-5 seconds and dried for up to thirty minutes. After drying, the article could be packaged in such non-permeable packaging to lock in effectiveness until opened. Once opened, the article offers approximately two to three hours of effective repellency.

It is noted that, while the present invention discussed above relates primarily to articles of disposable clothing, other items widely used in the home healthcare industry can also be treated in like manner adding to the overall suite of products that protect a healthcare worker from infestation. For example, in certain situations, the healthcare worker must put supplies on surfaces that could result in cross-infestation. By including treated chuck pads or other similar layers, the worker have an added barrier between an infested furniture item and his or her nursing bag, field tablet, personal items like car keys, wallet, etc. and other tools of the trade. As depicted in FIG. 6, the disposable pad is constructed in a way that the edges of the pad are infused while providing a repellant free center area to place personal items so that when done everything has been protected from bedbugs but doesn't end up coming in direct contact with the repellants.

EXAMPLE 1

A bedbug repellant article of clothing according to one embodiment was constructed utilizing the following: The substrate included an outer layer of spun-bonded polypropylene (PP) and an inner layer of cast polyethylene. The outer layer of the substrate was infused by spraying the repellant for three seconds directly followed by a brief thirty-minute drying period. The substrate can, with equal effectiveness, be dipped in the repellant again with a brief drying period. Once dried, the treated substrate is quickly packed in a non-permeable aluminum-lined polymer to avoid losing effectiveness. Once opened, the product acts as an effective repellant for approximately two to three hours. The repellant concentrations are as follows: 30% Distilled Water, 5% isolongifolanone by volume; 5% isolongifolenone by volume; 30% refined oil of lemon *eucalyptus* (OLE)(Citriodiol) by volume; and 30% DEET. It was demonstrated that such infused articles, when worn over regular clothing had no noticeable adverse effect on such clothing or accessories. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

EXAMPLE 2

A bedbug repellant disposable underpad ("chucks pad") according to one embodiment was constructed utilizing the following: The substrate included an outer layer of spun-bonded polypropylene (PP), an under layer of cast polyethylene, and an absorbent layer comprised of superabsorbent polymer (SAP) and cellulose fluff pulp. The edges of the outer layer of the substrate were infused by spraying the repellant for 3 seconds directly followed by a brief 30 minute drying period. Once dried, the treated substrate is quickly packed in a non-permeable aluminum lined polymer to avoid losing effectiveness. Once opened, the product acts as an effective repellant for approximately two to three hours. The repellant concentrations are as follows: 30% Distilled Water, 5% isolongifolanone by volume; 5% isolongifolenone by volume; 30% refined oil of lemon *eucalyptus* (OLE)(Citriodiol) by volume; and 30% DEET. It was demonstrated that such disposable underpads, when placed on tables, beds, couches and chairs, carpets, and other various furniture had no noticeable effect on such items. Other repellant concentrations suitable for use with the present example and in connection with the present invention also include a) 30% Oil of Lemon *Eucalyptus*, 70% Distilled Water; b) 5% DEET, 5% Isolonifolenone and 90% Distilled Water; c) 5% DEET, 5% Isolongifolanone and 90% Distilled Water; and d) 5% DEET, 7% Picaridin and 88% Distilled Water; e) and a mix of 1.08% Essential Oils and 98.92% Distilled Water.

VARIATIONS

While the present invention has been discussed in connection particularly with the home healthcare industry, it is not intended to be limited to such applications. The present invention has utility in a variety of other industries including but not limited to hotels, motels and other hospitality services, housekeeping and house cleaning services, pest control services and janitorial services.

In other embodiments, the clothing articles could include a lining under the treated fabric. This prevents the repellant from rubbing off onto the user's primary clothing or skin, which in turn allows the invention to be a completely self-contained solution. Elastic cinches could also be included where the fabric ends allowing for easy securing of potential breach points. Buttons and clips could also be included, allowing various articles of treated clothing to attach to each other, again securing potential breach points.

What is claimed is:

1. A method of infusing a disposable article with an insect repellent comprising the steps of:
   a) providing the disposable article, wherein the disposable article comprises an outer, water absorbent layer and an inner, waterproof layer, wherein the outer, water absorbent layer comprises spun-bonded polyester and the inner, waterproof layer comprises cast polyethylene;
   b) applying the insect repellent to the outer, water absorbent layer;
   c) drying the insect repellent.

2. The method of claim 1 wherein the insect repellent includes an effective amount of one or more repellants selected from the group consisting of DEET (N,N-diethyl-meta-toluamide) OLE (oil of lemon *eucalyptus*) and essential oils.

3. The method of claim 2, wherein the insect repellent includes DEET in concentrations of at least 30% by volume.

4. The method of claim 2, wherein the insect repellent includes OLE in concentrations of at least 30% by volume.

5. The method of claim 2, wherein the insect repellent includes essential oils in concentrations of at least 0.18% by volume.

6. The method of claim 2, wherein the essential oils are selected from the group consisting of arborvitae, cedar wood, citronella, lemongrass, lemon, peppermint, apple cider vinegar, *eucalyptus*, tea tree, bergamot, lavender, wintergreen, *melaleuca* and rosemary alone or in combination.

7. The method of claim 1, wherein the insect repellent includes one or more repellants selected from the group consisting of: picaridin in concentrations of 7% by volume or greater; permethrin in concentrations of 0.5% by volume or greater; isolongifolenone in concentrations of 5% by volume or greater; isolongifolanone concentrations of 5% by volume or greater; ethyl butylacetylaminopropionate in concentrations of 20% by volume or greater; 2-undecanone in concentrations of 7.75% by volume or greater.

8. A method of infusing a disposable article with an insect repellant, wherein the insect repellent includes DEET in concentrations of at least 30% by volume, comprising the steps of:
a) providing the disposable article, wherein the disposable article comprises an outer, water absorbent layer and an inner, waterproof layer wherein the outer, water absorbent layer comprises spun-bonded polyester and the inner, waterproof layer comprises cast polyethylene;
b) applying the insect repellant to the outer, water absorbent layer;
c) drying the insect repellant.

9. The method of claim 8, wherein the outer, water absorbent layer further comprises spun-bonded polypropylene.

10. The method of claim 8 wherein the insect repellent includes an effective amount of one or more repellants selected from the group consisting of DEET (N,N-diethyl-meta-toluamide) OLE (oil of lemon *eucalyptus*) and essential oils.

11. The method of claim 10, wherein the insect repellent includes OLE in concentrations of at least 30% by volume.

12. The method of claim 10, wherein the insect repellent includes essential oils in concentrations of at least 0.18% by volume.

13. The method of claim 10, wherein the essential oils comprise arborvitae, cedar wood, citronella, lemongrass, lemon, peppermint, apple cider vinegar, *eucalyptus*, tea tree, bergamot, lavender, wintergreen, *melaleuca* and rosemary alone or in combination.

14. The method of claim 8, wherein the insect repellent further includes one or more secondary repellants selected from the group consisting of: picaridin in concentrations of 7% by volume or greater; permethrin in concentrations of 0.5% by volume or greater; isolongifolenone in concentrations of 5% by volume or greater; isolongifolanone concentrations of 5% by volume or greater; ethyl butylacetylaminopropionate in concentrations of 20% by volume or greater; 2-undecanone in concentrations of 7.75% by volume or greater.

15. A method of infusing a disposable article with an insect repellant, wherein the insect repellant includes essential oils in concentrations of at least 0.18% by volume, comprising the steps of:
a) providing the disposable article, wherein the disposable article comprises an outer, water absorbent layer and an inner, waterproof layer, wherein the outer, water absorbent layer comprises spun-bonded polyester and the inner, waterproof layer comprises cast polyethylene;
b) applying the insect repellant to the outer, water absorbent layer;
c) drying the insect repellant.

16. The method of claim 15, wherein the outer, water absorbent layer further comprises spun-bonded polypropylene.

17. The method of claim 15 wherein the insect repellent includes an effective amount of one or more repellants selected from the group consisting of DEET (N,N-diethyl-meta-toluamide) OLE (oil of lemon *eucalyptus*) and essential oils.

18. The method of claim 17, wherein the insect repellent includes DEET in concentrations of at least 30% by volume.

19. The method of claim 17, wherein the insect repellent includes OLE in concentrations of at least 30% by volume.

20. The method of claim 15, wherein the essential oils comprise arborvitae, cedar wood, citronella, lemongrass, lemon, peppermint, apple cider vinegar, *eucalyptus*, tea tree, bergamot, lavender, wintergreen, *melaleuca* and rosemary alone or in combination.

21. The method of claim 15, wherein the insect repellent further includes one or more secondary repellants selected from the group consisting of: picaridin in concentrations of 7% by volume or greater; permethrin in concentrations of 0.5% by volume or greater; isolongifolenone in concentrations of 5% by volume or greater; isolongifolanone concentrations of 5% by volume or greater; ethyl butylacetylaminopropionate in concentrations of 20% by volume or greater; 2-undecanone in concentrations of 7.75% by volume or greater.

22. A method of infusing a disposable article with an insect repellant, wherein the insect repellant includes one or more repellants selected from the group consisting of: picaridin in concentrations of 7% by volume or greater; permethrin in concentrations of 0.5% by volume or greater; isolongifolenone in concentrations of 5% by volume or greater; isolongifolanone concentrations of 5% by volume or greater; ethyl butylacetylaminopropionate in concentrations of 20% by volume or greater; 2-undecanone in concentrations of 7.75% by volume or greater, comprising the steps of:
a) providing the disposable article, wherein the disposable article comprises an outer, water absorbent layer and an inner, waterproof layer, wherein the outer, water absorbent layer comprises spun-bonded polyester and the inner, waterproof layer comprises cast polyethylene;
b) applying the insect repellant to the outer, water absorbent layer;
c) drying the insect repellant.

23. The method of claim 22, wherein the outer, water absorbent layer further comprises spun-bonded polypropylene.

24. The method of claim 22 wherein the insect repellant further includes an effective amount of one or more repellants selected from the group consisting of DEET (N,N-diethyl-meta-toluamide) OLE (oil of lemon *eucalyptus*) and essential oils.

25. The method of claim 24, wherein the insect repellent includes DEET in concentrations of at least 30% by volume.

26. The method of claim 24, wherein the insect repellent includes OLE in concentrations of at least 30% by volume.

27. The method of claim 24, wherein the insect repellent includes essential oils in concentrations of at least 0.18% by volume.

28. The method of claim 24, wherein the essential oils comprise arborvitae, cedar wood, citronella, lemongrass, lemon, peppermint, apple cider vinegar, *eucalyptus*, tea tree, bergamot, lavender, wintergreen, *melaleuca* and rosemary alone or in combination.

* * * * *